United States Patent
Gimblet et al.

(10) Patent No.: US 9,201,208 B2
(45) Date of Patent: Dec. 1, 2015

(54) CABLE HAVING CORE, JACKET AND POLYMERIC JACKET ACCESS FEATURES LOCATED IN THE JACKET

(71) Applicants: Michael John Gimblet, Conover, NC (US); Julian Latelle Greenwood, III, Hickory, NC (US)

(72) Inventors: Michael John Gimblet, Conover, NC (US); Julian Latelle Greenwood, III, Hickory, NC (US)

(73) Assignee: CORNING CABLE SYSTEMS LLC, Hickory, NC (US)

( * ) Notice: Subject to any disclaimer, the term of this patent is extended or adjusted under 35 U.S.C. 154(b) by 228 days.

(21) Appl. No.: 13/658,404

(22) Filed: Oct. 23, 2012

(65) Prior Publication Data

US 2013/0108226 A1      May 2, 2013

Related U.S. Application Data

(60) Provisional application No. 61/552,048, filed on Oct. 27, 2011.

(51) Int. Cl.
*G02B 6/44*      (2006.01)

(52) U.S. Cl.
CPC .................. *G02B 6/4495* (2013.01)

(58) Field of Classification Search
USPC ........................................ 385/100–109, 147
See application file for complete search history.

(56) References Cited

U.S. PATENT DOCUMENTS

| | | |
|---|---|---|
| 3,076,235 A | 2/1963 | Rollins et al. |
| 3,991,014 A | 11/1976 | Kleinschuster .................. 260/47 |
| 4,067,852 A | 1/1978 | Calundann ........................ 260/47 |
| 4,083,829 A | 4/1978 | Calundann et al. .............. 260/47 |
| 4,130,545 A | 12/1978 | Calundann .................... 260/40 P |
| 4,237,337 A | 12/1980 | Serrander ................... 174/70 R |
| 4,248,824 A | 2/1981 | Hattop ........................... 264/171 |
| 4,318,842 A | 3/1982 | East et al. ..................... 524/605 |
| 4,456,331 A | 6/1984 | Whitehead et al. ........ 350/96.23 |
| 4,468,364 A | 8/1984 | Ide ............................. 264/176 R |
| 4,707,074 A | 11/1987 | Heywood .................. 350/96.23 |
| 4,729,628 A | 3/1988 | Kraft et al. ................. 350/96.23 |
| 4,848,868 A | 7/1989 | Rohner ...................... 350/96.23 |
| 5,218,659 A | 6/1993 | Schneider ..................... 385/110 |
| 5,360,497 A | 11/1994 | Schneider et al. .............. 156/47 |
| 5,442,722 A | 8/1995 | DeCarlo ....................... 385/114 |
| 5,636,308 A | 6/1997 | Personne et al. ............. 385/102 |
| 5,651,081 A | 7/1997 | Blew et al. ................... 385/101 |

(Continued)

FOREIGN PATENT DOCUMENTS

| | | | |
|---|---|---|---|
| DE | 4421456 A1 | 12/1995 | ............. B29C 47/02 |
| EP | 647866 A1 | 4/1995 | ............. G02B 6/44 |

(Continued)

OTHER PUBLICATIONS

Patent Cooperation Treaty International Search Report and Written Opinion for International Application No. PCT/US2012/061584; mailing date Feb. 18, 2013—12 pages.

(Continued)

*Primary Examiner* — Akm Enayet Ullah
(74) *Attorney, Agent, or Firm* — William D. Doyle

(57) ABSTRACT

Cables jacket are formed by extruding discontinuities in a main cable jacket portion. The discontinuities allow the jacket to be torn to provide access to the cable core. The armor cables have an armor layer with armor access features arranged to work in combination with the discontinuities in the cable jacket to facilitate access to the cable core.

20 Claims, 7 Drawing Sheets

(56) References Cited

U.S. PATENT DOCUMENTS

| | | | |
|---|---|---|---|
| 5,717,805 A | 2/1998 | Stulpin | 385/114 |
| 5,737,470 A | 4/1998 | Nagano et al. | 385/114 |
| 5,970,196 A | 10/1999 | Greveling et al. | 385/114 |
| 5,987,204 A | 11/1999 | Lee et al. | 385/100 |
| 6,041,153 A | 3/2000 | Yang | 385/109 |
| 6,088,499 A | 7/2000 | Newton et al. | 385/112 |
| 6,137,936 A | 10/2000 | Fitz et al. | 385/113 |
| 6,167,180 A | 12/2000 | Keller | 385/113 |
| 6,222,969 B1 | 4/2001 | Botelho et al. | 385/114 |
| 6,311,000 B1 | 10/2001 | Schneider | 385/113 |
| 6,351,589 B1 | 2/2002 | Leggett | 385/128 |
| 6,404,962 B1 | 6/2002 | Hardwick, III et al. | 385/114 |
| 6,519,396 B2 | 2/2003 | Schneider et al. | 385/101 |
| 6,542,674 B1 | 4/2003 | Gimblet | 385/113 |
| 6,545,222 B2 | 4/2003 | Yokokawa et al. | 174/110 R |
| 6,546,176 B2 | 4/2003 | Anderson et al. | 385/113 |
| 6,563,991 B1 | 5/2003 | Witt et al. | 385/107 |
| 6,603,908 B2 | 8/2003 | Dallas et al. | 385/109 |
| 6,661,956 B2 | 12/2003 | Yamasaki et al. | 385/109 |
| 6,704,481 B2 | 3/2004 | Gaillard et al. | 385/113 |
| 6,728,455 B2 | 4/2004 | Kusakari et al. | 385/113 |
| 6,760,522 B2 | 7/2004 | Okada et al. | 385/109 |
| 6,766,091 B2 | 7/2004 | Beuth et al. | 385/128 |
| 6,813,421 B2 | 11/2004 | Lail et al. | 385/101 |
| 6,876,798 B2 | 4/2005 | Triplett et al. | 385/100 |
| 6,957,000 B2 | 10/2005 | McAlpine et al. | 385/102 |
| 7,029,137 B2 | 4/2006 | Lionetti et al. | 362/84 |
| 7,050,685 B2 | 5/2006 | Plemmons et al. | 385/109 |
| 7,085,459 B2 | 8/2006 | Conrad et al. | 385/114 |
| 7,116,872 B2 | 10/2006 | Okuno et al. | 385/114 |
| 7,123,801 B2 | 10/2006 | Fitz | 385/105 |
| 7,136,556 B2 | 11/2006 | Brown et al. | 385/102 |
| 7,187,830 B2 | 3/2007 | Blazer | 385/114 |
| 7,197,215 B2 | 3/2007 | Baird et al. | 385/113 |
| 7,218,821 B2 | 5/2007 | Bocanegra et al. | 385/103 |
| 7,225,534 B2 | 6/2007 | Kachmar | 29/825 |
| 7,251,411 B1 | 7/2007 | Lu et al. | 385/147 |
| 7,346,244 B2 | 3/2008 | Gowan et al. | 385/113 |
| 7,379,642 B2 | 5/2008 | Kachmar | 385/102 |
| 7,391,943 B2 | 6/2008 | Blazer et al. | 385/100 |
| 7,400,810 B2 | 7/2008 | Tanaka et al. | 385/134 |
| 7,403,685 B2 | 7/2008 | Wells | 385/100 |
| 7,415,181 B2 | 8/2008 | Greenwood et al. | 385/100 |
| 7,424,189 B2 | 9/2008 | Lu et al. | 385/100 |
| 7,471,862 B2 | 12/2008 | Bringuier et al. | 385/114 |
| 7,480,436 B2 | 1/2009 | Wells et al. | 385/134 |
| 7,489,843 B2 | 2/2009 | Carlson et al. | 385/100 |
| 7,532,796 B2 | 5/2009 | Chiasson | 385/114 |
| 7,539,380 B1 | 5/2009 | Abernathy et al. | 385/100 |
| 7,567,741 B2 | 7/2009 | Abernathy et al. | 385/100 |
| 7,587,111 B2 | 9/2009 | de Montmorillon et al. | 385/127 |
| 7,590,321 B2 | 9/2009 | Lu et al. | 385/104 |
| 7,603,012 B1 | 10/2009 | Ice | 385/103 |
| 7,623,747 B2 | 11/2009 | De Montmorillon et al. | 385/124 |
| 7,693,375 B2 | 4/2010 | Freeland | 385/100 |
| 7,787,727 B2 | 8/2010 | Bringuier et al. | 385/113 |
| 7,796,853 B2 | 9/2010 | Abernathy et al. | 385/100 |
| 7,817,891 B2 | 10/2010 | Lavenne et al. | 385/109 |
| 8,649,644 B2 * | 2/2014 | Greenwood et al. | 385/100 |
| 8,737,787 B2 * | 5/2014 | Gimblet et al. | 385/100 |
| 2003/0118295 A1 | 6/2003 | Lail et al. | 385/101 |
| 2006/0045443 A1 | 3/2006 | Blazer | 385/114 |
| 2006/0127016 A1 | 6/2006 | Baird et al. | 385/113 |
| 2006/0291787 A1 | 12/2006 | Seddon | 385/113 |
| 2008/0013899 A1 | 1/2008 | Gowan et al. | 385/113 |
| 2008/0193092 A1 | 8/2008 | Greenwood et al. | 385/113 |
| 2009/0087148 A1 | 4/2009 | Bradley et al. | 385/76 |
| 2009/0274425 A1 | 11/2009 | Caldwell et al. | 385/102 |
| 2009/0274426 A1 | 11/2009 | Lail | 385/105 |
| 2009/0317039 A1 | 12/2009 | Blazer et al. | 385/107 |
| 2009/0324182 A1 | 12/2009 | Kachmar et al. | 385/104 |
| 2010/0132973 A1 | 6/2010 | Fitz et al. | 174/102 R |
| 2011/0217010 A1 | 9/2011 | Kachmar | 385/111 |
| 2011/0229098 A1 | 9/2011 | Abernathy et al. | 385/102 |

FOREIGN PATENT DOCUMENTS

| | | | |
|---|---|---|---|
| EP | 749129 A1 | 12/1996 | H01B 7/00 |
| EP | 1168024 B1 | 6/2006 | G02B 6/44 |
| EP | 1376156 B1 | 7/2006 | G02B 1/04 |
| JP | 60-91306 A | 5/1985 | G02B 6/24 |
| JP | 63-120206 U | 8/1988 | G02B 6/08 |
| JP | 9-230184 A | 9/1997 | G02B 6/44 |
| JP | 2005-148373 A | 6/2005 | G02B 6/44 |
| JP | 2005-345622 A | 12/2005 | G02B 6/44 |
| JP | 2006-162703 A | 6/2006 | G02B 6/44 |
| JP | 2006-171570 A | 6/2006 | G02B 6/44 |
| JP | 2006-251769 A | 9/2006 | G02B 6/44 |
| JP | 2006-251770 A | 9/2006 | G02B 6/44 |
| JP | 2006-267600 A | 10/2006 | G02B 6/44 |
| JP | 2007-272006 A | 10/2007 | G02B 6/44 |
| JP | 2009-37150 A | 2/2009 | G02B 6/44 |
| JP | 2009-258153 A | 11/2009 | G02B 6/44 |
| KR | 2006-0081266 | 7/2006 | G02B 6/44 |
| KR | 2006-0107414 | 10/2006 | G02B 6/02 |
| WO | 03/46074 A1 | 6/2003 | C08L 23/16 |
| WO | 2004/021367 A2 | 3/2004 | H01B 7/00 |
| WO | 2005/096053 A1 | 10/2005 | G02B 6/44 |
| WO | 2006/097540 A1 | 9/2006 | G02B 6/44 |
| WO | WO 2010/068857 A2 | 6/2010 | G02B 6/44 |
| WO | WO 2010/105657 A1 | 9/2010 | G02B 6/44 |
| WO | 2011/109498 A2 | 9/2011 | |
| WO | 2011/137236 A1 | 11/2011 | B29C 47/02 |
| WO | 2012/058181 A1 | 5/2012 | G02B 6/44 |
| WO | 2012/071490 A2 | 5/2012 | B29C 47/02 |

OTHER PUBLICATIONS

U.S. Appl. No. 13/445,517, filed Apr. 12, 2012, Eric R. Logan, 29 pages.
U.S. Appl. No. 13/489,901, filed Jun. 6, 2012, Michael J. Gimblet, 23 pages.
U.S. Appl. No. 13/560,374, filed Jul. 27, 2012, Michael John Gimblet, 24 pages.
U.S. Appl. No. 13/646,962, filed Oct. 8, 2012, Anne Germaine Bringuier, 26 pages.
U.S. Appl. No. 13/658,404, filed Oct. 23, 2012, Michael John Gimblet, 21 pages.
U.S. Appl. No. 13/658,431, filed Oct. 23, 2012, Samuel Don Nave, 19 pages.
Nippon Telegraph and Telephone Corporation, Specification for Aerial SM Optical Fiber Cable, Spec. No. 520292, 4$^{th}$ Version, Jul. 29, 2002, 56 pages.
Renka Corporation, Single Mode Optical Fiber Cable, Specification No: RENKA/OFC/SM-DI/AR, Dec. 2000, 13 pages.
PCT IPRP for Publication WO2011137236, Nov. 6, 2011, 10 pages.
PCT ISR for Publication WO2011137236, Aug. 9, 2011, 6 pages.
PCT ISR for Publication WO2012058181, Feb. 23, 2012, 4 pages.
PCT ISR for Publication WO2012071490, Sep. 12, 2012, 7 pages.

* cited by examiner

CABLE HAVING CORE, JACKET AND POLYMERIC JACKET ACCESS FEATURES LOCATED IN THE JACKET

RELATED APPLICATIONS

This application claims the benefit of priority under 35 U.S.C. §119 of U.S. Provisional Application No. 61/552,048, filed on Oct. 27, 2011, the content of which is relied upon and incorporated herein by reference in its entirety.

FIELD OF THE DISCLOSURE

An armored fiber optic cable is disclosed, specifically a fiber optic cable having access features for accessing a core of the fiber optic cable, and an armor layer with access features.

BACKGROUND

It is common for outdoor cables to include an armor layer for protection from rodent attack, crush, and/or for providing a robust cable design. The armor is typically formed from a tape such as a metallic (e.g. steel) or nonmetallic (e.g. plastic) or combinations thereof. It can be difficult and time consuming for the craft to remove the armor to access the optical fibers within the fiber optic cable without damaging the fibers. Additionally, injury can result if the craftsman does not exercise care when opening the armor to access the optical fibers. Further, for armored cables having a polymer jacket extruded over the surface of the cable armor, the jacket must be cut away before the armor can be accessed. Removing the jacket section from armored fiber optic cables adds time to an already time-intensive and expensive access process.

SUMMARY

According to one aspect of the present embodiments, a cable comprises a core an armor surrounding the core, the armor comprising at least one armor access feature formed in the armor to weaken the armor at the access feature, and a jacket surrounding the armor. The jacket comprises a primary portion of a first extruded polymeric material and at least one discontinuity of a second extruded polymeric material in the primary portion, the discontinuity extending along a length of the cable, and the first material being different from the second material. The bond between the discontinuity and the primary portion allows the jacket to be separated at the discontinuity to provide access to the core, and the at least one armor access feature and the at least one discontinuity are arranged proximate to each other to allow access to the core.

According to another aspect, a cable comprises a core, a buffer tube surrounding the core, the buffer tube comprising at least one buffer tube discontinuity formed in the buffer tube to weaken the buffer tube at the buffer tube discontinuity, the buffer tube discontinuity being formed from a different material than that of a primary portion of the buffer tube, and a jacket surrounding the buffer tube. The jacket comprises a primary portion of a first extruded polymeric material, and at least one jacket discontinuity of a second extruded polymeric material in the primary portion, the jacket discontinuity extending along a length of the cable, and the first material being different from the second material. The bond between the jacket discontinuity and the primary portion allows the jacket to be separated at the jacket discontinuity to provide access to the core, and the at least one buffer tube discontinuity and the at least one jacket discontinuity are arranged proximate to each other to allow access to the core.

BRIEF DESCRIPTION OF THE DRAWINGS

According to common practice, the various features of the drawings discussed below are not necessarily drawn to scale. Dimensions of various elements in the drawings may be expanded or reduced to more clearly illustrate embodiments of the invention.

DETAILED DESCRIPTION

Figure 1:
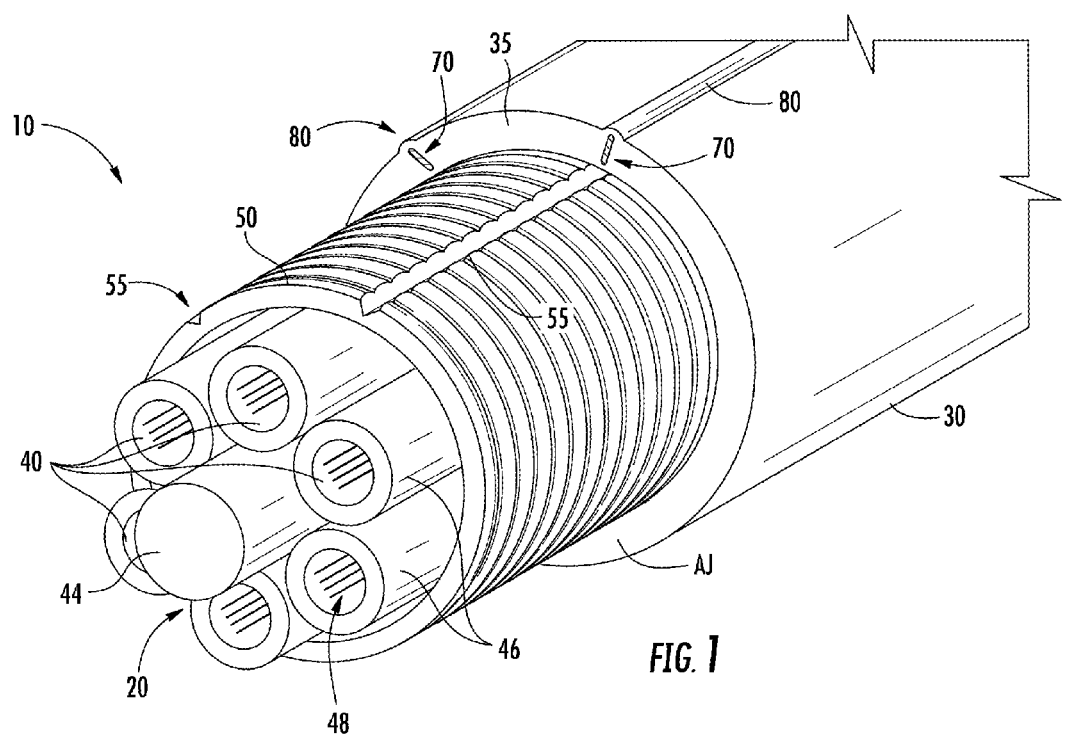
FIG. 1 is a cutaway view of a fiber optic cable according to a first embodiment.

Reference is now made in detail to the present preferred embodiments of the disclosure, examples of which are illustrated in the accompanying drawings. Whenever possible, identical or similar reference numerals are used throughout the drawings to refer to identical or similar parts.

FIG. 1 is a partial cutaway view of a fiber optic cable 10 according to a first embodiment. The cable 10 comprises a core 20 surrounded by a jacket 30 having a primary portion 35. In the illustrated embodiment, the core 20 includes a plurality of optical transmission elements 40 arranged about a central strength member 44. The optical transmission elements 44 are annular polymeric tubes 46 with one or more optical fibers 48 extending along the length of the cable 10. The optical fibers 48 are capable of conveying optical data. An annular armor 50 surrounds the optical transmission elements 40. The jacket 30 can abut and can extruded over the armor so that the jacket is bonded to the exterior surface of the armor 50. The armor 50 has one or more armor access features 55 formed in the armor 50. As described in further detail below, the armor access features 55 can be similar or identical to the scoring lines disclosed in U.S. Pub. No. 20090317039, the contents of which are incorporated by reference herein.

The jacket 30 can be formed primarily from polymer materials, and can be generally referred to as "polymeric." In this specification, the terms "polymer" and "polymeric" indicate materials comprised primarily of extrudable polymer materials such as, for example, copolymers, but allows for the presence of non-polymer materials such as additives and fillers. The core 20 can be, for example, any assembly or arrangement having data-transmission and/or power-transmission capabilities.

Figure 5:
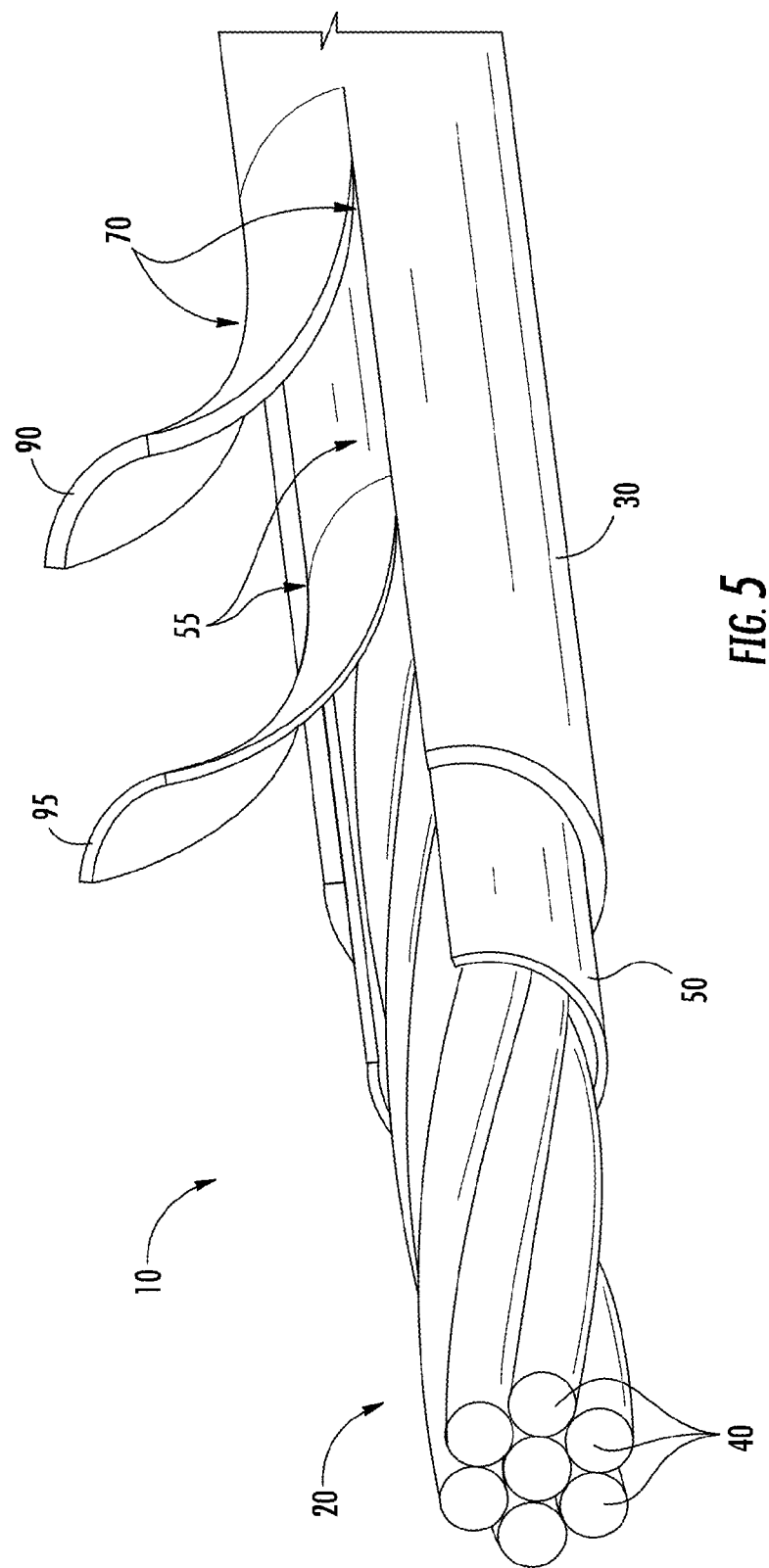
FIG. 5 is a partial cutaway showing core access through armor access features and discontinuities in the cable jacket.

The jacket 30 includes a separation feature that facilitates access to the core 20. In the exemplary embodiment, the separation feature is a pair of extruded discontinuities 70 that extend along the length of the cable 10. In this specification, the term "discontinuity" indicates a portion of the jacket 30 of different material composition than the primary portion 35 of the jacket 30. The primary portion 35 can essentially be an annular hoop surrounding the core 20, with the discontinuities 70 extending longitudinally through the primary portion 35 along a selected length of the cable 10. According to one aspect, the discontinuities 70 provide lines of weakness that allow the jacket 30 to be separated (as shown in FIG. 5). The illustrated discontinuities 70 extend along the entire cable length, although shorter lengths, such as 20 cm or more, may be used to provide access to the core 20. According to another aspect of the present embodiment, discontinuities in the jacket 30 are arranged to work in cooperation with the armor access features 55 to facilitate access to the core 20. The cable jacket 30 can also include tactile locator features 80, such as raised surfaces, or 'bumps', or depressed surfaces such as 'divots' or channels, that provide a tactile indication of the location of the discontinuities 70 and for the armor access features 55. A visual indication such as a stripe could also be extruded over the location of the discontinuities 70 so that their locations are apparent from the cable exterior. Tactile or visual indicators can extend along the entire length of the cable, or along selected lengths.

Figure 2:
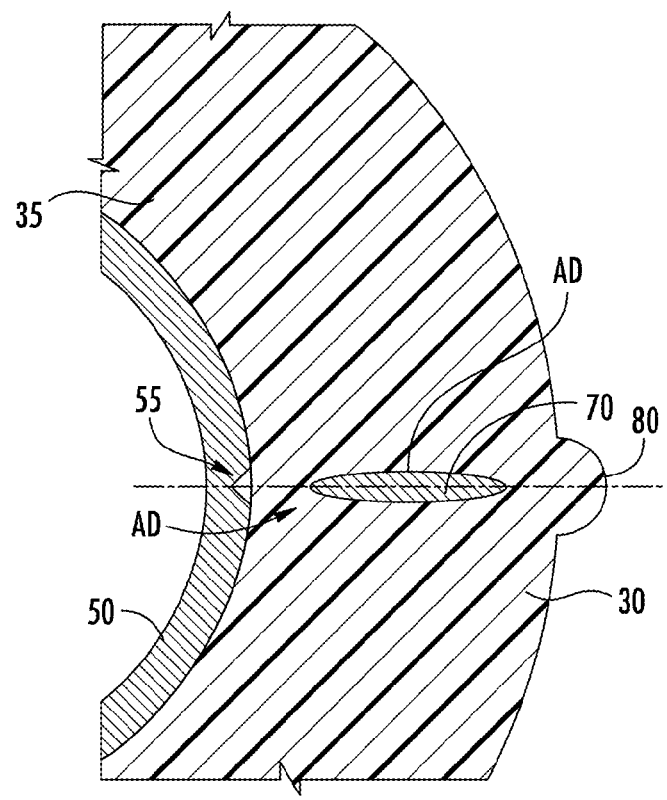
FIG. 2 is a partial cross-section of the cable jacket illustrated in FIG. 1.

FIG. 2 is a partial cross-section of the jacket 30 and armor 50 in isolation, taken on a plane perpendicular to a length of the cable 10. In the exemplary embodiment, the discontinuities 70 are bonded to the primary portion of the jacket 35 when the jacket 30 is extruded. The illustrated discontinuities 70 are wholly embedded in the primary portion 35, but one or both ends of the discontinuities may extend to either jacket surface. The primary portion 35 and the discontinuities 70 can be formed from extrudable polymers, so that as the extrudates used to form the primary portion 35 and the discontinuities 70 cool and solidify, the extrudates become bonded to a desired degree at an interface on each side of a discontinuity 70. When the discontinuities 70 are formed while extruding the primary portion 35 of the jacket, the bond between discontinuity 70 and the remainder of the jacket 30 can be generally described as enabled by polymer chain entanglement as the jacket 30 solidifies. The jacket 30 accordingly comprises a cohesive composite polymer structure.

The discontinuities 70 can be strips that may each occupy up to, for example, 5% of the total jacket cross-sectional area AJ. In exemplary embodiments, discontinuities 70 can be relatively narrow strips in the jacket 30, and may occupy relatively small portions of the jacket cross-sectional area AJ. For example, the discontinuities 70 can have cross-sectional areas AD that are less than 3% of AJ. In the illustrated embodiment, the discontinuities 70 each have cross-sectional areas AD that are less than 2% of AJ. In FIGS. 1 and 2, two discontinuities 70 are formed in the jacket 30 to facilitate opening of the jacket as shown in FIG. 1. Depending on the form that the core 20 takes, the number, spacing, shape, composition and other aspects of the discontinuities 70 can be varied. For example, a single discontinuity in the jacket 30 may be sufficient to allow the cable jacket 30 to be peeled away from the core 20.

Figure 3:
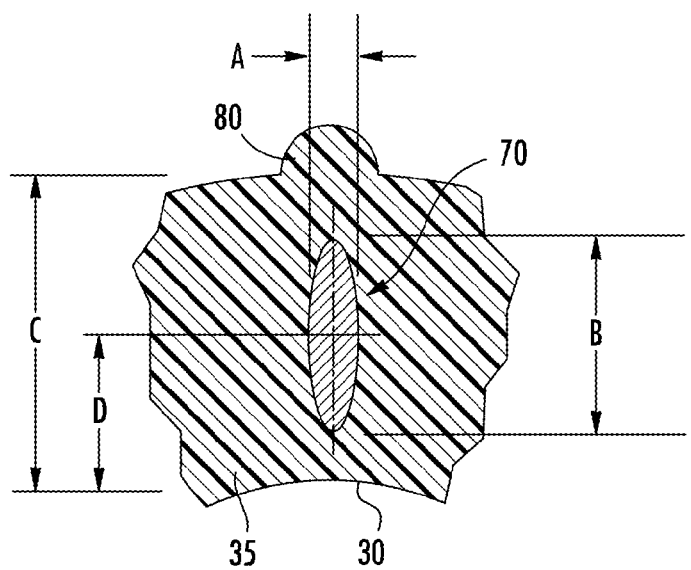
FIG. 3 is an isolated cross-sectional view of one of discontinuities in a cable jacket.

FIG. 3 is an isolated view of one of the discontinuities 70 in the jacket 30. A discontinuity 70 can have a maximum width A, a height B, and a center spacing from the jacket interior surface of D. The jacket thickness is C. According to one aspect, the aspect ratio A:B is in the range of 1:4 to 1:100. In general, lower aspect ratios A:B, which indicates narrower discontinuities, are favorable in cable cross-sections as shown in FIG. 1. It is these discontinuities that allow for a stress concentration to develop at the root of a discontinuity and thus initiate failure of the primary jacket material. The illustrated ratio B:C is about 1:2, which indicates that the height of a discontinuity is about half of the jacket thickness. The ratio B:C is selected to provide ease of access to the core and to maintain sufficient robustness of the cable 10, and will vary with factors such as the fracture toughness of the material of the primary portion 35, the bond between the discontinuities 70 and the primary portion 35, and other factors. According to one embodiment, the ratio B:C is at least 1:4, or, stated alternatively, B is at least ¼ of the jacket thickness C at the centerline of the cable. If an extremely thin, "film" type embodiment of discontinuity 70 is included, the maximum width A of a discontinuity can be in the range of 0.2 mm or less, and may be about 0.1 mm.

The materials and processes used to form the primary portion 35 and the discontinuities 70 can be selected so that the interfaces therebetween allow for relatively easy access to the core 20 by peeling back the jacket 30 as shown in FIG. 5. The cable jacket primary portions 35 and the discontinuities 70 described in this specification may be made from various polymer materials. Either the primary portion 35 or the discontinuities 70 may be made from polypropylene (PP), polyethylene (PE), or blends of materials such as a blend of PE and ethylene vinyl acetate (EVA), flame-retardant material such as flame-retardant polyethylene, flame-retardant polypropylene, polyvinyl chloride (PVC), or polyvinylidene fluoride (PVDF), filled materials such as polybutylene terephthalate (PBT), a polycarbonate and/or a polyethylene (PE) material and/or an ethylene vinyl acrylate (EVA) or other blends thereof having fillers like a chalk, talc, or the like, and other materials such as a UV-curable acrylates.

In the exemplary embodiments, the primary portion can be extruded from a first extrudable polymeric material comprising at least 80% of a first polymer, polyethylene, by weight, and the discontinuities can be extruded from a second extrudable polymeric material comprising at least 70% of a second polymer, polypropylene, by weight and additionally at least 0.5% of the first polymer polyethylene by weight. Higher amounts by weight of the first polymer may be included in the second material, such as at least 1.0%, or at least 2%. Without being bound by theory, Applicants believe the bond between polypropylene and polyethylene may be caused by one or both of quantities of ethylene that are compounded in the polypropylene bonding with the polyethylene, and molecular entanglement between the PE and PP. According to this understanding, the amount of ethylene in the PP extrudate can be increased to increase the bond between the discontinuities and the remainder of the jacket. In one embodiment, the primary portion 35 is made from a first polyethylene extruded material, such as a medium density polyethylene (MDPE). The discontinuities 70 are made from a second, polypropylene/polyethylene blend of extruded material, the blend including from 6% to 20% polyethylene, with the remainder of the blend being primarily a polypropylene material. The first polymer material can be, for example, a unimodal or bimodal type polyethylene defined by its molecular weight distribution, with the lower molecular weight polymer chains increasing bond strength at the interface of the jacket and the feature (through the process of promoting entanglements and co-crystallization).

In another exemplary embodiment, the primary portion can be extruded from a first extrudable polymeric material comprising PVC (e.g., GW 2278LT2 PVC) and the discontinuities can be extruded from a second extrudable polymeric material comprising, for example, e.g., Megolon 8037DE available from AlphaGary Corporation. In this embodiment, the discontinuities have a stronger bond with the primary portion, and tear internally within the discontinuities.

Figure 4:
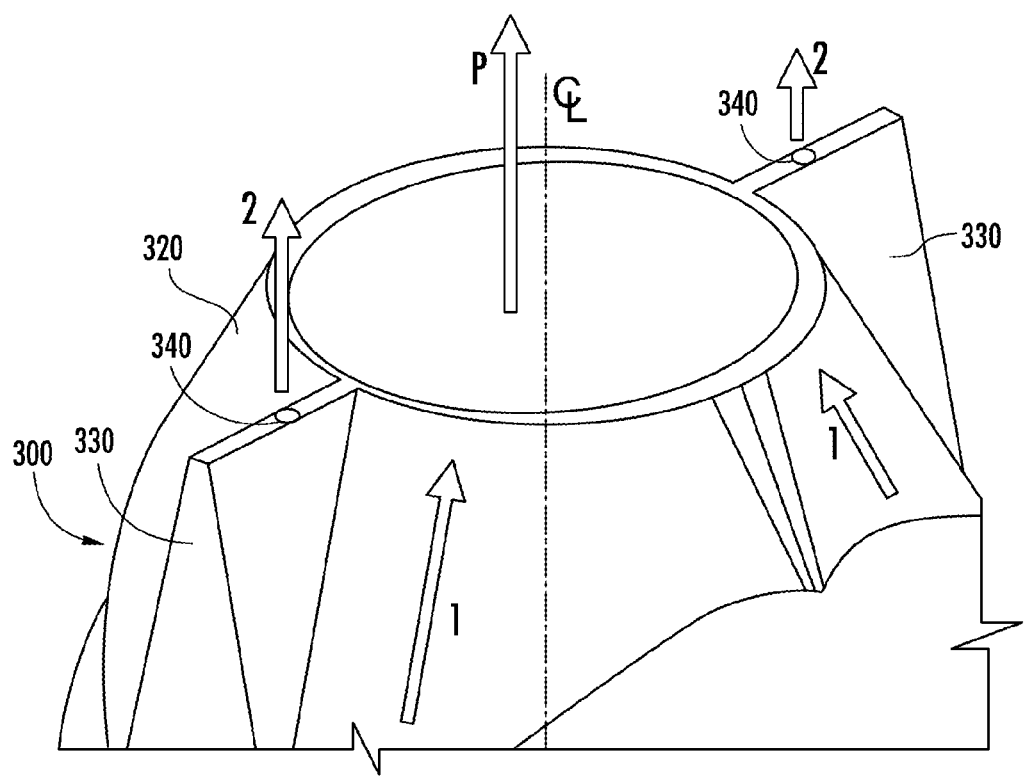
FIG. 4 is a cutaway view of a portion of a coextrusion apparatus used to manufacture cables with discontinuities.

FIG. 4 is a cutaway section view of a coextrusion flow diverter 300 that can be used in conjunction with an extrusion crosshead commonly used to form an annular jacket such as the jacket 30. The flow diverter 300 can be a modification of an existing component of an extrusion apparatus. In such an extrusion apparatus, the extrusion tip and die are directly downstream of flow diverter 300. The arrows 1 in FIG. 4 illustrate the flow direction of a first molten extrudate, and the arrows 2 indicate the flow direction of a second molten extrudate. The flow diverter 300 has an exterior surface 320 over which flows the first molten extrudate material that is used to form the primary portion 35 of the jacket 30. The diverter 300 includes a pair of struts or fins 330, each having a port 340 that allows introduction of the second molten extrudate material used to form the discontinuities 70 into the flow of the first molten extrudate. The flow diverter 300 acts to divide the first material around the ports 340 supplying the second material. The first and second extrudate materials join downstream of the flow diverter 300. As the first and second materials are extruded, a core (not shown) including one or more optical fibers advances along the center line CL in the process direction P. The first and second extrudate materials draw down, cool, and solidify around the fiber optic core advancing through the crosshead to form the jacket 30. The tactile locator features 80 can be included by forming an exterior radius in the extrusion die. The jacket 30 can be extruded directly over the armor 50. The armor 50 can be applied about the core 20 in a conventional process. Scoring of the armor can be performed during the manufacturing process or the armor material used in the manufacturing process can be pre-scored.

Referring back to FIGS. 1 and 2, the armor 50 is designed to work in cooperation with the discontinuities 70 in the jacket to facilitate access to the core 20. The armor 50 includes one or more lines of scoring 55 that provide the craft with one or more dedicated locations for opening the armor to the access optical fiber(s) 48 in the core 20. Scoring of the armor greatly reduces and/or eliminates the risk of damaging the optical fibers during the access procedure. The armor 50 can be formed from an armor tape such as dielectric or conductive material (e.g. steel or other metals). In the illustrated embodiment, the armor 50 is a corrugated metallic tape that includes a coating (not shown) for inhibiting corrosion. The armor 50 preferably is mechanically robust enough to withstand penetration by foreign objects, such as attack by rodents, and to inhibit the migration of moisture into cable core 20. The armor 50 may include an overlap seam (not shown) formed by a non-offset layer and offset layer, but a butt seam is also possible. The ends of armor 50 can be fixed together in any suitable manner, such as by an adhesive, weld, or the like, which may also aid in sealing.

In this specification, "scoring" refers to cuts or grooves formed in at least one surface of the armor 50 for reducing the thickness relative to the remainder of the armor, thereby creating a dedicated access location created by a weakened portion of the armor. Scoring should not be confused with corrugation, which deforms the armor but does not reduce the thickness of the armor for providing a dedicated access location. Instead, corrugation of the armor aids in the flexibility of the armor/fiber optic cable. Lines of scoring 55 of armor 50 may be formed along the inner surface, outer surface, or both surfaces of the armor. A depth of the line of scoring can vary between about 10% to about 80% of a thickness of the armor, more preferably the depth is between about 30% and 60% of the thickness. The term "scoring" can also include perforations that extend from the outer surface to the inner surface of the armor 50 in an intermittent fashion; however, this could create a leak path into the cable core. Generally speaking, lines of scoring weaken the armor in defined areas, thereby providing the craft easier access to cable core 20.

FIG. 5 illustrates how the access features in the cable jacket 30 and in the armor 50 provide access to the cable core 20. The cable jacket 30 can first be cut or pinched at a section 90 of the jacket, and the section can be peeled back as shown in FIG. 4. Pinching one side of the cable 10 causes the cable jacket 30 to begin separating at the discontinuities 70, and the section 90 can then be grasped, pulled away from the rest of the jacket 30, and torn along the discontinuities 70. In this method, the bond between the jacket section 90 and the armor 50 can be calibrated so that a large amount of peel force is not required to pull the section 90 back as shown in FIG. 4. After the section 90 has been peeled back, the craftsperson can access the armor 50. The armor access features 55 in the armor 50 allow the craftsperson to pull back a section 95 of the armor. In an alternative access method, the sections 90 and 95 can be peeled back as a single piece.

Figure 6:
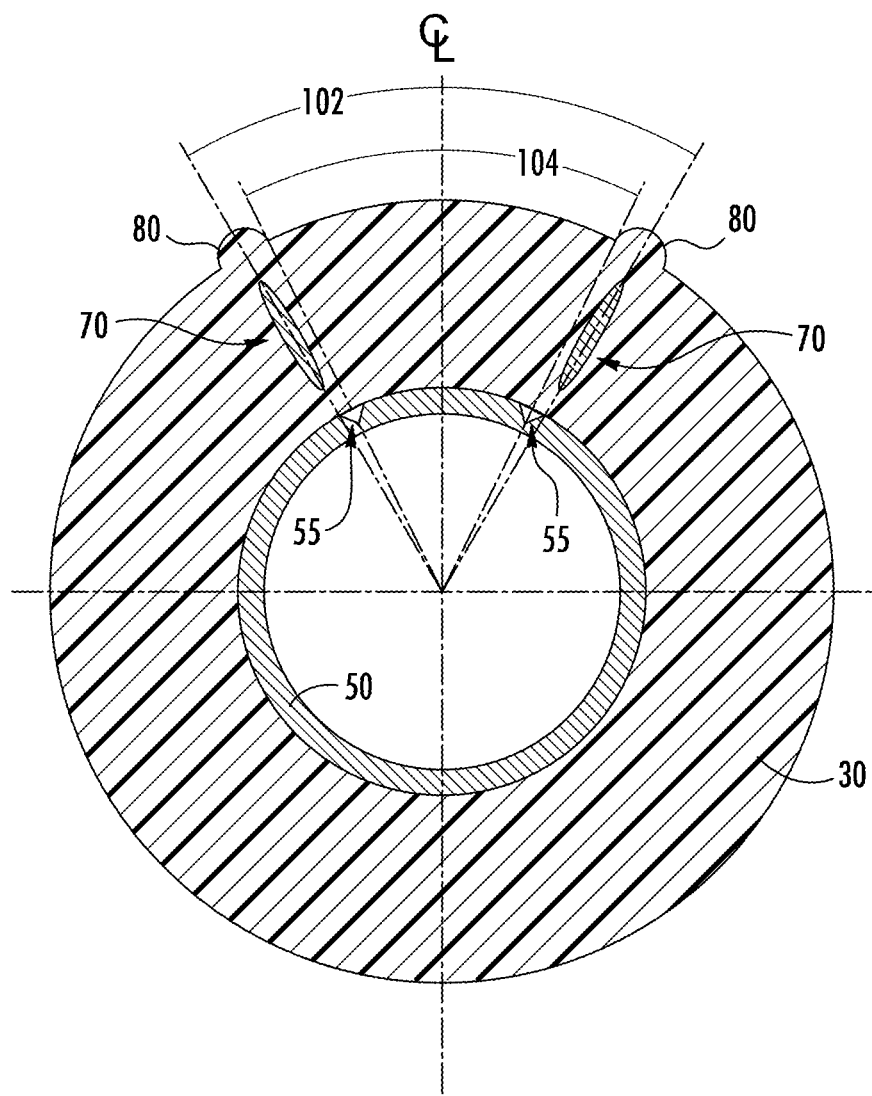
FIG. 6 illustrates relative arc spacing of armor access features and discontinuities in a cable jacket.

FIG. 6 is a cross-sectional view of a cable according to the present embodiments illustrating an exemplary relative angular relationship between armor access features 55 and the discontinuities 70 in the jacket 30. For a cable of generally circular cross-section, it is advantageous for the armor access features 55 and the discontinuities to be aligned along the same radius line. However, to facilitate a two-step access process in which the jacket is first accessed followed by the armor, it is possible for the armor access features 55 to be more closely spaced, as shown in FIG. 5. In this arrangement, with additional jacket material removed from the surface of the armor 50, the access features 55 are more easily identified and accessed. To provide this access to the access features 55, the arc separation 102 of the discontinuities 70 can be at least 3 degrees larger than the arc separation 104 of the access features 55. In the general, the arc separation of the armor access features and of the discontinuities can be in the range of 10-180 degrees. The difference between the arc separation 102 and the arc separation 104 can be less than, 20 degrees.

Ease of access through the cable jacket 30 can be defined, for example, by the force required to pull, or peel away a section of the cable jacket at one or more discontinuities. The peel force can be measured as a direct force measurement, in Newtons, of the force a person must exert as the jacket section is peeled away from the cable core. It is understood that the jacket will not be perfectly uniform, and that a person or machine cannot exert a perfectly uniform force as the jacket is peeled, so "peel forces" described in this specification indicate an average force exerted as a distance of the jacket section is peeled back. It is also understood that peel forces according to the present embodiments are measured without any additional modifications to the cable jacket exterior, such as by scoring. The peel forces can be relatively low when compared to the forces required to access a cable without extruded discontinuities. For example, a peel force may be less than about 90 Newtons (N). In exemplary embodiments, the peel force required may be from about 20 N to about 65 N. Peel forces are defined herein to include any force great enough to cause the jacket material to rip, tear, or otherwise separate along the discontinuities 70 for accessing the cable core. It is relatively easy to measure peel force. Using cable 10 as a reference, about 25 mm of jacket is cut away from one end of the cable 10. The ends of the cable 10 are secured to a bench or other sturdy surface. A small hole is placed in the jacket proximal to the edge of the jacket where it was cut away from the core, and one end of an "S" hook is inserted into the hole in the jacket. If the cable includes a pair of spaced discontinuities, the hole is formed midway between the two discontinuities. A lanyard or wire is attached to the other end of the S hook. The lanyard is fixed to a force gauge, such as a Chatillon gauge available from Ametek Test and Calibration Instruments of Largo, Florida. The force gauge is pulled by hand or by some mechanical means, away from the cable at an angle of 45 degrees to the cable centerline, until the section of the jacket attached to the S hook peels away from the rest of the jacket. The jacket section is pulled for a distance of 270-700 mm away from the initial jacket removal location. The average peel force can be calculated as the average force measured by the force gauge as the jacket section is pulled along the selected distance.

Figure 7:
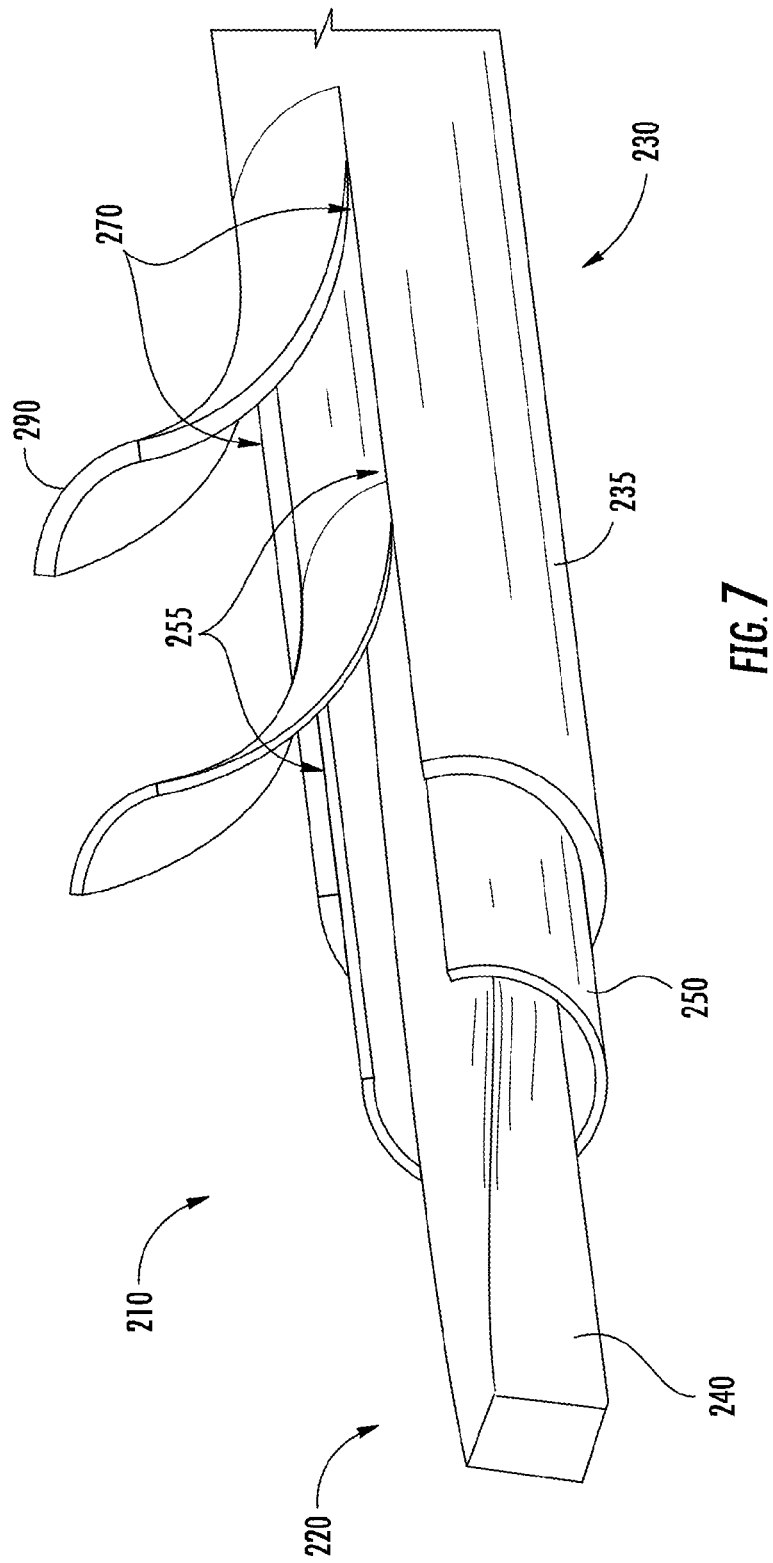
FIG. 7 is a cutaway view of a fiber optic cable according to a second embodiment in which access features in a cable jacket align with access features in a buffer tube.

FIG. 7 is a partial cutaway view of a fiber optic cable 210. The cable 210 comprises a core 220 surrounded by a jacket 230 having a primary portion 235. In the illustrated embodiment, the core 220 includes a stack 240 of optical fiber ribbons (illustrated schematically). An annular polymeric buffer tube 250 surrounds the ribbon stack 240. The jacket 230 can abut and can be extruded over the buffer tube 250 so that the jacket is at least partially bonded to the exterior surface of the buffer tube 250. The buffer tube 250 has one or more buffer tube discontinuities 255 formed in the buffer tube 250. The discontinuities 255 in the buffer tube 250 are designed to work in cooperation with jacket discontinuities 270 in the jacket to facilitate access to the core 220. The buffer tube discontinuities 255 can be similar and/or identical in shape and in relative dimension to the buffer tube 250 as the jacket discontinuities are to the jacket 30 shown in FIGS. 2-3. The jacket 230 can be similar in shape, composition and function to the jacket 30 shown in FIGS. 2-3. The discontinuities 270, 255 in the buffer tube and jacket respectively can be arranged in the same angular relationships as discussed with reference to FIG. 6 so as to provide a quick, one-step jacket and buffer tube access procedure. The illustrated cable 210 can be a conventional SST® cable available from Corning Cable Systems LLC, modified to include discontinuities in the buffer tube and in the jacket.

Figure 8:
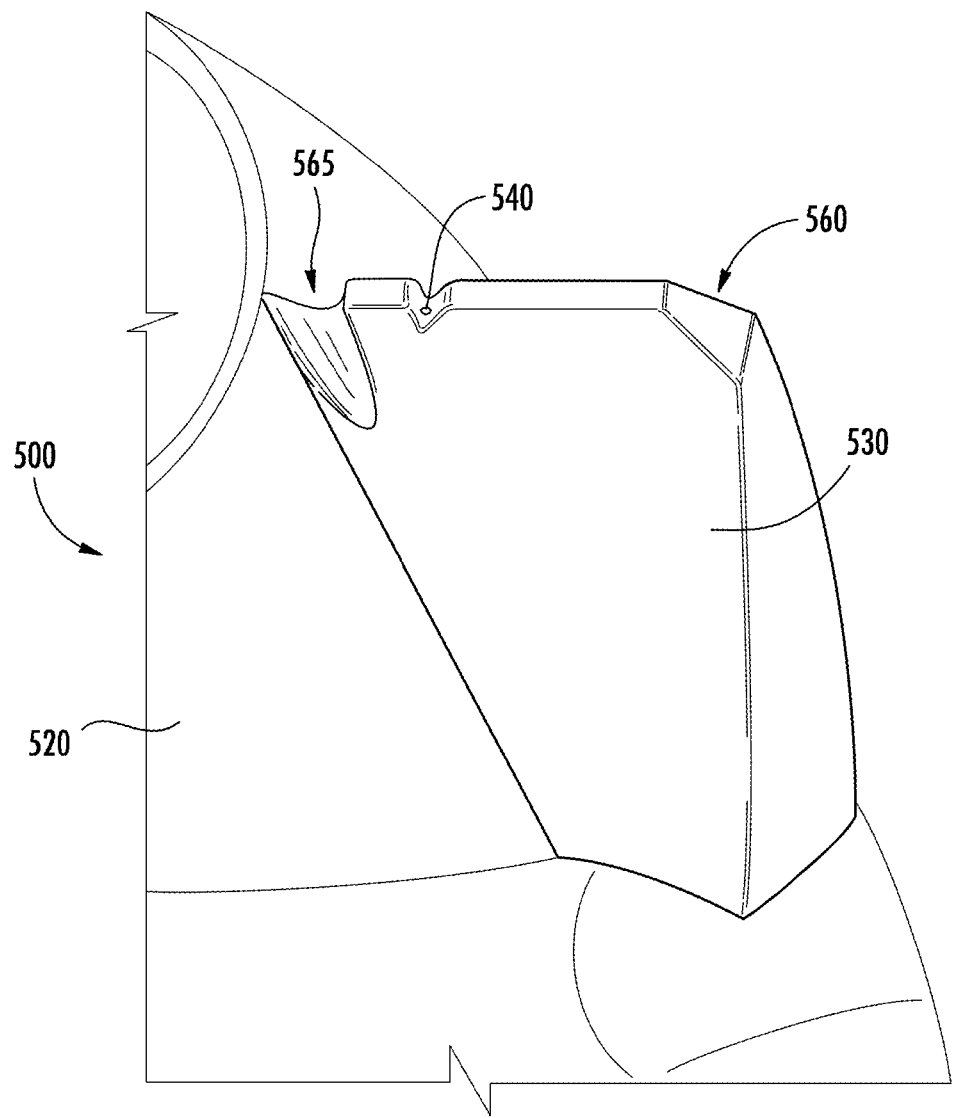
FIG. 8 is a cutaway view of a portion of a coextrusion apparatus used to manufacture cables with discontinuities.

FIG. 8 is a cutaway section view of a coextrusion flow diverter 500 showing an isolated view of a fin 530. The flow diverter can be of similar form and operation to the flow diverter 300 shown in FIG. 4. The fin 530 has a port 540 that allows the introduction of a second molten extrudate material used to form discontinuities. The fin 530, however, differs in that the edge of the fin has a beveled edge 560, and a curved notch 565 is formed in the base of the fin 530. The beveled edge 560 and the notch 565 help to control extrudate flow as its passes over the surface 520 of the diverter 500 and over the fin 530.

In general, the separation properties disclosed in this specification may be obtained by coextruding the discontinuities from a different material than the material used to form the primary portion of the jacket. As an alternative method, the discontinuities may be made from the same material as the remainder of the jacket, but subjected to different curing conditions, for example.

Subject matter disclosed in this application may be related to subject matter disclosed in U.S. application Ser. No. 12/214,461, published as US20090317039, PCT/US11/34309, filed Apr. 28, 2011, to U.S. Prov. App. No. 61/407,744, filed Oct. 28, 2010, U.S. Prov. App. No. 61/416,684, filed Nov. 23, 2010, U.S. Prov. App. No. 61/546,597, filed Oct. 13, 2011, and to U.S. Prov. App. No. 61/546,694, filed Oct. 13, 2011, each of which is incorporated by reference herein in its entirety.

What is claimed is:

1. A cable, comprising:
    a core;
    an armor surrounding the core; and
    a jacket surrounding the armor, the jacket comprising:
        a primary portion of a first extrudate polymeric material; and
        at least one discontinuity of a second extrudate polymeric material in the primary portion, the discontinuity extending along a length of the cable, and the first material being different from the second material,
    wherein a bond between the discontinuity and the primary portion allows the jacket to be separated at the discontinuity to provide access to the core.

2. The cable of claim 1, wherein the armor comprises at least one armor access feature formed in the armor to weaken the armor at the access feature.

3. The cable of claim 2, wherein the at least one armor access feature and the at least one discontinuity are arranged proximate to each other to allow access to the core.

4. The cable of claim 3, wherein the at least one armor access feature comprises at least one line of scoring disposed in an outer surface of the metallic armor.

5. The cable of claim 4, wherein the at least one line of scoring comprises a first line of scoring and a second line of scoring circumferentially spaced on the armor by an arc separation between 10-180 degrees, wherein the at least one discontinuity comprises a first discontinuity and a second discontinuity circumferentially spaced on the jacket by an arc separation between 10-180 degrees, and wherein the difference between the arc separation of the discontinuities and the lines of scoring is less than 20 degrees.

6. The cable of claim 5, wherein the first line of scoring is discontinuous.

7. The cable of claim 5, wherein the first discontinuity is located within 1 mm of the first line of scoring.

8. The cable of claim 1, wherein the jacket is extruded directly over the armor so that the jacket is at least partially bonded to the armor.

9. The cable of claim 8, wherein the armor comprises an annular metallic tape wrapped around the core.

10. The cable of claim 8, wherein the armor is corrugated and wrapped around the core with an overlap.

11. A cable, comprising:
    a core;
    at least one of an armor and a buffer tube surrounding the core; and
    a jacket surrounding the at least one of an armor and a buffer tube, the jacket comprising:
        a primary portion of a first extrudate polymeric material; and
        at least one discontinuity of a second extrudate polymeric material in the primary portion, the discontinuity extending along a length of the cable, and the first material being different from the second material,
        wherein the at least one discontinuity is wholly embedded in the primary portion.

12. The cable of claim 11, wherein a cross-sectional area of each discontinuity is less than five percent of a cross-sectional area of the jacket, and the jacket is applied about the core by co-extruding the first material and the second material together.

13. The cable of claim 12, wherein each discontinuity is bonded with the primary portion of the jacket, and wherein a section of the primary portion located between the first and second discontinuities is separable from a remainder of the jacket by a peel force of less than 80 Newtons (N) exerted on the section.

14. The cable of claim 13, wherein the peel force is less than 50 N.

15. The cable of claim 11, wherein the first extrudate polymeric material is comprised of at least eighty percent by weight of a first polymer, and wherein the second extrudate polymeric material is comprised of at least seventy percent by weight of a second polymer and at least 0.5 percent by weight of the first polymer.

16. The cable of claim 15, wherein the first polymer is polyethylene and second polymer is polypropylene.

17. The cable of claim 11, wherein the at least one discontinuity has a maximum width measured perpendicular to a radius of the cable passing through the discontinuity that is less than 0.2 mm.

18. A cable, comprising:
a core;
a tube surrounding the core,
a jacket surrounding the tube, the jacket comprising:
    a primary portion of a first extrudate polymeric material; and
    at least one discontinuity of a second extrudate polymeric material in the primary portion, the discontinuity extending along a length of the cable, and the first material being different from the second material,
wherein a bond between the discontinuity and the primary portion allows the jacket to be separated at the discontinuity to provide access to the core.

19. The cable of claim 18, wherein
the tube is at least one of:
    an armor comprising at least one armor access feature formed in the armor to weaken the armor at the access feature; and
    a buffer tube surrounding the core, the buffer tube comprising at least one buffer tube access feature formed in the buffer tube to weaken the buffer tube at the buffer tube access feature,
wherein the at least one discontinuity and either the at least one armor access feature or the at least one buffer tube access feature allow access to the core.

20. The cable of claim 18, wherein the first extrudate polymeric material is comprised of at least eighty percent by weight of a first polymer, and wherein the second extrudate polymeric material is comprised of at least seventy percent by weight of a second polymer and at least 0.5 percent by weight of the first polymer.

* * * * *